United States Patent [19]

McDonald

[11] Patent Number: 5,963,245
[45] Date of Patent: Oct. 5, 1999

[54] VIDEO TELEPHONE

[76] Inventor: Arcaster McDonald, 166-05 Highland Ave., apt. 8C, Jamaica, N.Y. 11432

[21] Appl. No.: 08/936,718

[22] Filed: Sep. 24, 1997

[51] Int. Cl.[6] ........................................ H04N 7/14
[52] U.S. Cl. ................................. 348/14; 348/16
[58] Field of Search ..................... 348/12–20; 379/93.09, 379/93.17, 93.21, 93.23, 100.16; 345/905

[56] References Cited

U.S. PATENT DOCUMENTS

| | | | |
|---|---|---|---|
| 5,138,649 | 8/1992 | Krisbergh et al. | 348/14 |
| 5,341,167 | 8/1994 | Guichard et al. | 348/14 |
| 5,418,560 | 5/1995 | Yasuda | 379/93.23 |
| 5,528,285 | 6/1996 | Morikawa et al. | 348/14 |
| 5,541,640 | 7/1996 | Larson | 379/93.17 |
| 5,612,732 | 3/1997 | Yuyama et al. | 348/14 |
| 5,734,415 | 3/1998 | Hwang | 348/14 |
| 5,760,824 | 6/1998 | Hick, III | 348/14 |

FOREIGN PATENT DOCUMENTS 1-119821   5/1989   Japan ................ G06F 3/16

Primary Examiner—Curtis A. Kuntz
Assistant Examiner—George Eng
Attorney, Agent, or Firm—Michael I. Kroll

[57] ABSTRACT

A video telephone including a display unit and a handset for transmitting and receiving both audio signals and digital data representative of video images over an established communication channel across a conventional telephone line. The display unit includes a receiver for receiving signals from the handset and a display screen for displaying a video image. A microprocessor is connected to the receiver and the display unit. A data storage device for storing data representative of an image and a digital camera for capturing a digital image are also connected to the microprocessor. The digital camera transmits the captured digital image to the microprocessor. The video telephone is operable between a first not-in-use mode in which the microprocessor reads data stored in the data storage device and displays the image represented by the data on the display unit and a second in-use mode in which the microprocessor receives the digital data representative of the captured image from the digital camera and the digital data received over the established communication channel for display of both the digital data representative of the captured image from the digital camera and the digital data received over the established communication channel on the display unit simultaneously. The handset includes a power switch for generating a control signal for switching said video telephone between said first and second modes and a transmitter for transmitting said control signal to said display unit.

1 Claim, 6 Drawing Sheets

VIDEO TELEPHONE

BACKGROUND OF THE INVENTION

1. Field of the Invention

The present invention relates generally to communication devices and, more specifically, to a video telephone retained on a wall and including remote control capabilities.

2. Description of the Prior Art

Numerous video and audio communication devices have been provided in the prior art. For example, U.S. Pat. Nos. 4,715,059; 4,932,047; 4,985,911; and 5,191,601 all are illustrative of such prior art. While these units may be suitable for the particular purpose to which they address, they would not be as suitable for the purposes of the present invention as heretofore described.

U.S. Pat. No. 4,715,059

Inventor: Michael A. Cooper-Hart et al.

Issued: Dec. 22, 1987

The present invention is a conversational freeze-frame video phone which transmits a source image over a standard telephone line in conjunction with audio voice signals. A camera is used to capture an image to be transmitted and the image is mapped onto an image field of 2,000 to 5,000 pixels. The image field is displayed on a display area of approximately one square inch on a display screen. Digitized data representing the pixels is asynchronously transmitted on a modulated signal in a single burst of less than three seconds duration. Corresponding remote images are asynchronously received, demodulated, and displayed. The transmission of the audio signals is interrupted upon the detection of a video image being transmitted.

U.S. Pat. No. 4,932,047

Inventor: Lawrence D. Emmons et al.

Issued: Jun. 5, 1990

An improved video phone transmits a source image over a standard telephone line in conjunction with voice signals. The unique initialization protocol provides a hardware preamble for synchronizing a receiver clock, a software preamble for identifying the video image and disabling the audio, automatic gain control adjustment data and amplitude calibration data. The audio portion is disabled by coupling a capacitor across the telephone to effectively short the telephone. The telephone is placed across a bridge circuit which is provided with switches to balance the bridge in both the telephone and video modes. The transmitted and received signals pass through the same delay equalization circuit, so that half the equalization is done before transmission, with the remaining half being done after reception. Input and output selectors allow the same circuit to be used. The digital signals are level shifted up prior to being converted into analog, and then are shifted down again to reduce the effects of DC offset. The digital and analog voltage supplies are coupled together with a resistor and diode, and a capacitor is coupled between the analog supply and ground to combine the reset and voltage supply functions. An RC circuit providing 180 degrees of phase shift is coupled to the crystal oscillator to produce a clock which is locked into the series resonant frequency of the oscillator. The camera and the rest of the circuitry are turned on and off by a switch coupled to panel which can be slid in front of the camera.

U.S. Pat. No. 4,985,911

Inventor: Lawrence D. Emmons et al.

Issued: Jan. 15, 1991

An improved video phone which transmits a source image over a standard telephone line in conjunction with audio voice signals is disclosed. The unique initialization protocol allows asynchronous transmission with its short format. The protocol format provides for a hardware preamble for synchronizing a receiver clock, a software preamble for identifying the video image and disabling the audio, automatic gain control adjustment data and amplitude calibration data. The audio portion is disabled by coupling a capacitor across the telephone to effectively short the telephone. The telephone is placed across the bridge circuit which is provided with switches to balance the bridge in both the telephone audio and the video modes. The transmitted as well as the received signals are passed through the same delay equalization circuit, so that half the delay equalization is done before transmission, with the remaining half being done after reception. The use of a multiplexer and demultiplexer allows the same circuit to be used. The digital signals are level shifted from 5 volts to 10 volts prior to being converted into analog, and then are shifted down again to reduce the effects of DC offset. The digital and analog voltage supplies are coupled together with a resistor and diode, and a capacitor is coupled between the analog supply and ground to combine the reset and voltage supply functions. An RC circuit providing 180 degrees of phase shift is coupled to the crystal oscillator to produce a clock which is locked into the series resonant frequency of the oscillator. The camera and the rest of the circuitry are turned on and off by a switch coupled to panel which can be slid in front of the camera, thus providing for the automatic protection of the camera lens when the system is switched off.

U.S. Pat. No. 5,191,601

Inventor: Takashi Ida et al.

Issued: Mar. 2, 1993

A video phone unit comprising a decoder for expanding a received picture transmitted from the other party, a television camera for photographing a subject for producing a photographed picture on one party side, a hook for detecting whether the camera is immobile or mobile and generating either a first detecting signal indicating that the hook is in a mobile state or a second detecting signal indicating that the hook is immobile, a changeover switch for selecting either the received picture expanded at the decoder or the photographed picture taken at the camera after receiving the first or second detecting signal provided from the hook, a display for displaying one picture selected at the changeover switch, and a coder for compressing and transmitting the photographed picture provided from the camera to the other party.

SUMMARY OF THE PRESENT INVENTION

The present invention relates generally to communication devices and, more specifically, to a video telephone retained on a wall and including remote control capabilities.

A primary object of the present invention is to provide a video telephone that will overcome the shortcomings of prior art devices.

Another object of the present invention is to provide a video telephone which is able to be controlled via a remote control mobile/cordless telephone handset.

An additional object of the present invention is to provide a video telephone including a display screen which may be hung on a wall.

A further object of the present invention is to provide a video telephone which includes a camera which can be manipulated remotely to pan up and down.

A yet further object of the present invention is to provide a video telephone which provides a picturesque image on its display screen when not in use.

A still further object of the present invention is to provide a video telephone including a speaker and microphone for use without the need for a handset.

An even further object of the present invention is to provide a video telephone wherein an image of the calling and receiving party are viewable on the screen.

Another object of the present invention is to provide a video telephone that is simple and easy to use.

A still further object of the present invention is to provide a video telephone that is economical in cost to manufacture.

Additional objects of the present invention will appear as the description proceeds.

A video telephone including a display unit and a handset for transmitting and receiving both audio and video images over an established communication channel across a conventional telephone line is disclosed by the present invention. The display unit is connected to the conventional telephone line for receiving at least one of audio signals and digital data signals representative of an image captured by a video telephone on an other end of the established communication channel. The display unit includes a receiver for receiving signals from the handset and a display screen for displaying a video image. A microprocessor is connected to the receiver and the display unit. A data storage device for storing data representative of an image and a digital camera for capturing a digital image are also connected to the microprocessor. The digital camera transmits the captured digital image to the microprocessor. The video telephone is operable between a first not-in-use mode in which the microprocessor reads data stored in the data storage device and displays the image represented by the data on the display unit and a second in-use mode in which the microprocessor receives the digital data representative of the captured image from the digital camera and the digital data received over the telephone line for display of both the digital data representative of the captured image from the digital camera and the digital data from the telephone line on the display unit simultaneously. The handset includes a power switch for generating a control signal for switching said video telephone between said first and second modes and a transmitter for transmitting said control signal to said display unit To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
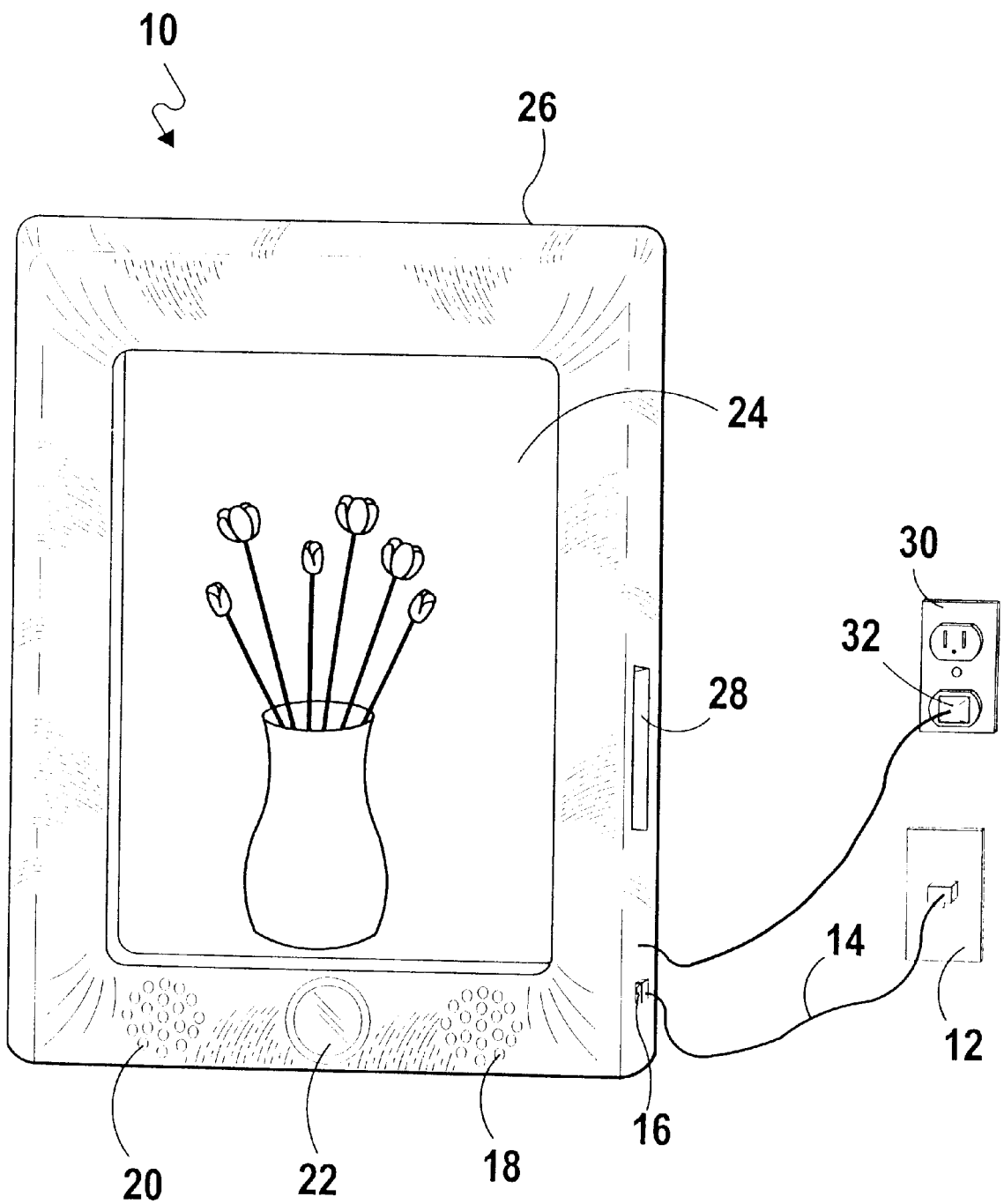
FIG. 1 is a front perspective view of the video telephone of the present invention in a not-in-use mode.

Turning now descriptively to the drawings, in which similar reference characters denote similar elements throughout the several views, the Figures illustrate the video telephone of the present invention. With regard to the reference numerals used, the following numbering is used throughout the various drawing figures.

10 video telephone of the present invention
12 telephone outlet
14 telephone cord
16 telephone input jack
18 speaker
20 microphone
22 camera
24 display/monitor showing not-in-use picture
26 housing
28 disk drive
30 electrical outlet
32 electrical plug
36 display/monitor showing in-use video image of other party
38 display/monitor showing in-use video image captured by camera
40 mobile/cordless telephone handset
41 off key for mobile/cordless telephone handset
42 on/talk key for mobile/cordless telephone handset
44 function/number keys on mobile/cordless telephone handset
46 volume control keys for mobile/cordless telephone handset
48 camera control keys for mobile/cordless telephone handset
50 speaker on mobile/ cordless telephone handset
51 microphone on mobile/cordless telephone handset
52 redial key on mobile/cordless telephone handset
54 speaker phone key on mobile/cordless telephone handset
56 power recharge port for mobile/cordless telephone handset
58 audio/video processor
60 ringer on display unit
62 motor for controlling camera motion
64 monitor for display unit
66 volume control for speaker on display unit
68 transmitter for transmitting signals to mobile/cordless telephone handset 70 receiver in mobile/cordless telephone handset
72 ringer in mobile/cordless telephone handset
74 power source in mobile/cordless telephone handset
76 transmitter in mobile/cordless telephone mobile/cordless telephone handset
78 microprocessor in mobile/cordless telephone handset
80 memory in mobile/cordless telephone handset
82 hanging clip
84 receiver in display unit

DETAILED DESCRIPTION OF THE PREFERRED EMBODIMENT

Turning now descriptively to the drawings, in which similar reference characters denote similar elements throughout the several views, FIGS. 1 through 6 illustrate a video telephone indicated generally by the numeral 10 for use with a remote/cordless telephone handset indicated generally by the numeral 40 in an audio/video communication system utilizing the existing telephone network and telephone lines.

Figure 2:
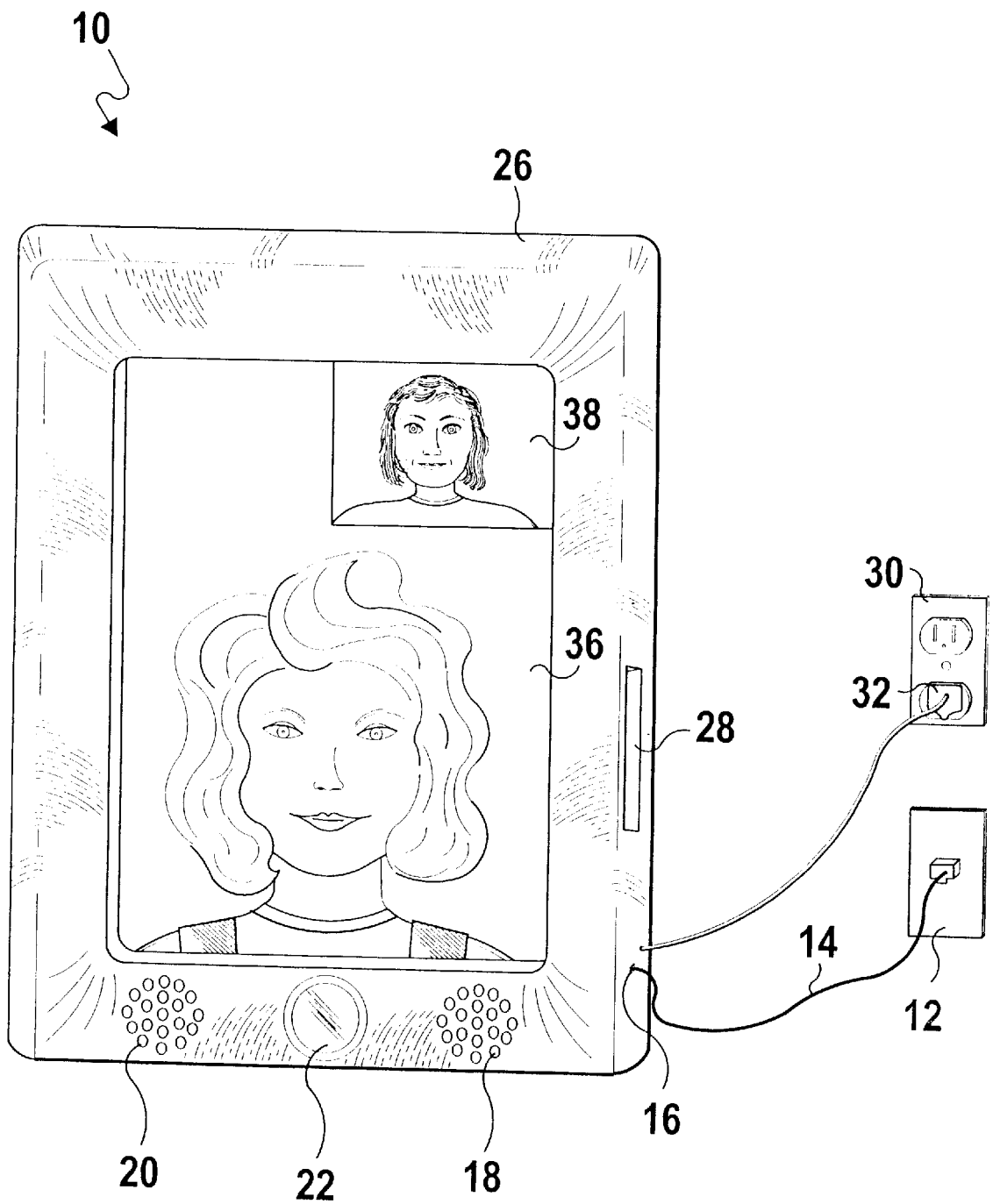
FIG. 2 is a front perspective view of the video telephone of the present invention in an in-use mode.
Figure 3:
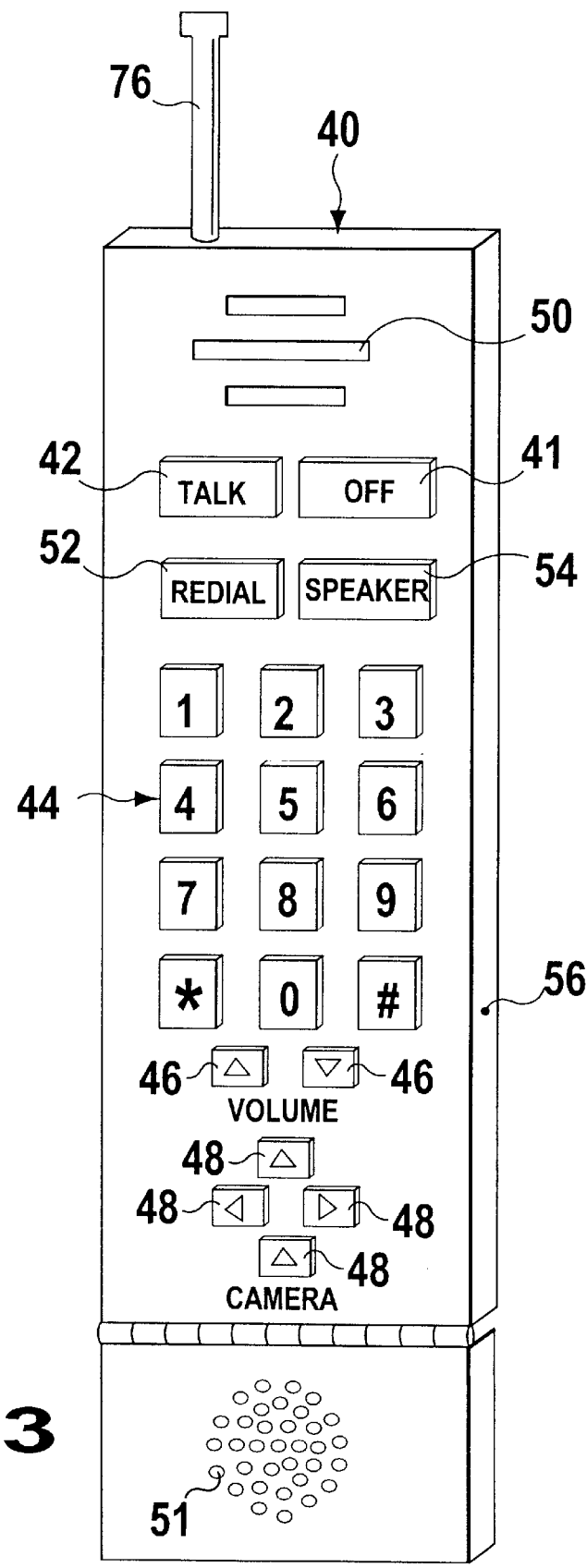
FIG. 3 is a front perspective view of the remote control for the video telephone of the present invention.

The video telephone 10 includes a video display unit 26 illustrated in FIGS. 1 and 2 and a mobile/cordless telephone handset 40 illustrated in FIG. 3. The video display unit 26 includes a speaker 18, a microphone 20, a camera 22 and a display screen 24. The display screen 24 displays a desired image when the video telephone 10 is not in use as shown in FIG. 1 and displays both an image captured by the camera 22 and an image of the party at the other end of the communication and received as digital data over the telephone line when in-use. The camera 22 is a digital camera which captures a digital image. When in use the speaker 18 and microphone 20 provide an audio communication channel with the party at the other end of the communication. The video display unit 24 includes a disk drive 28 for receiving a diskette including data representative of the image to be displayed during the not-in-use periods. The display unit 24 includes a microprocessor therein as will be described hereinafter with specific reference to FIG. 5 for reading the diskette and displaying the image represented by the data on the display screen 24 in the not-in-use period and displaying the digital images captured by the cameras 22 on both ends of the communication during the in-use period. The display unit 26 also includes a telephone connection port 16 for connecting via a connection wire 14 to a telephone outlet 12 and thus to the conventional telephone lines and an electrical plug 32 for connection to and receiving power from a conventional electrical outlet 30. The display unit 26 may also include an internal power source for supplying power thereto. The display unit 26 includes either hooks or other means for placement on a wall as is illustrated in FIG. 4.

When in-use, the display unit 26 displays both the image of the party captured by a camera on the other end of the established communication channel 36 and an image 38 captured by the camera 22 of the present display unit 26. Thus, a party using the video telephone 10 can view both the party to which they are communicating and themselves.

The mobile/cordless handset 40 for remotely controlling the operation of the display unit 26 is illustrated in FIG. 3. The mobile/cordless handset 40 includes an off switch 41 for terminating a connection and a talk switch 42 for initiating a connection, e.g. picking up the telephone to receive an incoming call or turning the telephone on to initiate an outgoing call. A numerical keypad 44 for dialing a telephone number to initiate a conversation with another party is also present on a face of the mobile/cordless handset 40. The mobile/cordless handset 40 also includes volume control keys 46 and camera control keys 48. The volume control keys 46 control the volume level of the speaker 18 on the video display unit 26 and the camera control keys 48 control movement of the camera 22 in the video display unit 26. A speaker 50 and microphone 51 are also present for communication through the handset 40 along with a redial key 52 and speakerphone key 54 as in a conventional telephone handset. The redial key 52 redials the last telephone number dialed and the speakerphone key 54 provides for speakerphone communication through the speaker 18 and microphone 20 on the display unit 26. Transmission of these signals from all of the keys on the mobile/cordless handset 40 is via a transmitter 76 positioned within the mobile/cordless handset 40.

Figure 4:
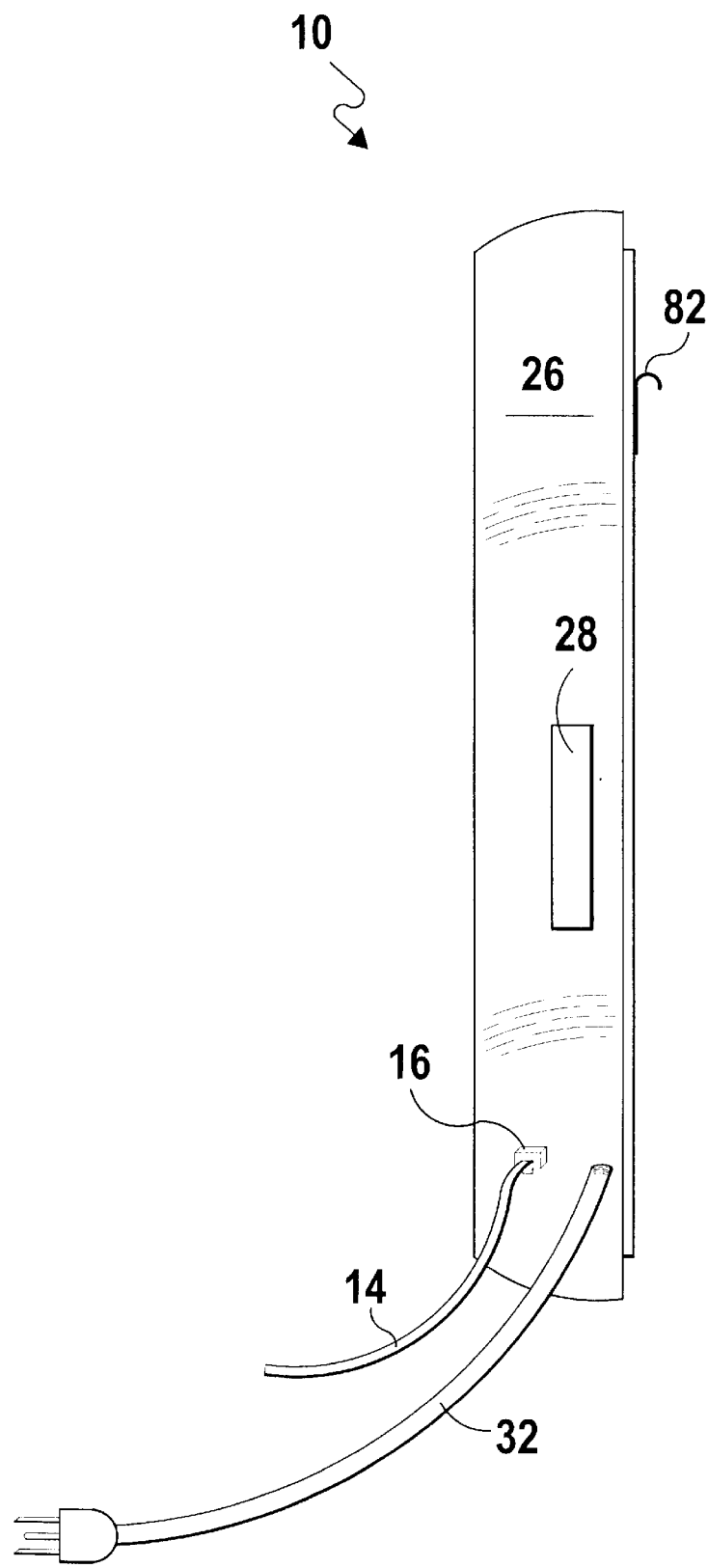
FIG. 4 is a side view of the video telephone of the present invention.

A side view of the video display unit 26 is shown in FIG. 4. From this view the connection 16 to the telephone line and the external power source connection 32 are clearly seen. The disk drive 28 for insertion of a diskette is also clearly seen. Operation of the disk drive 28 with reference to the display unit 26 will be described in more detail hereinafter. Also seen in this figure is a clip 82 for hanging the video display unit 26 on a wall. It is to be realized that the clip 82 is used for purposes of example only and that any means for hanging and retaining the display unit 26 on a wall may be used.

Figure 5:
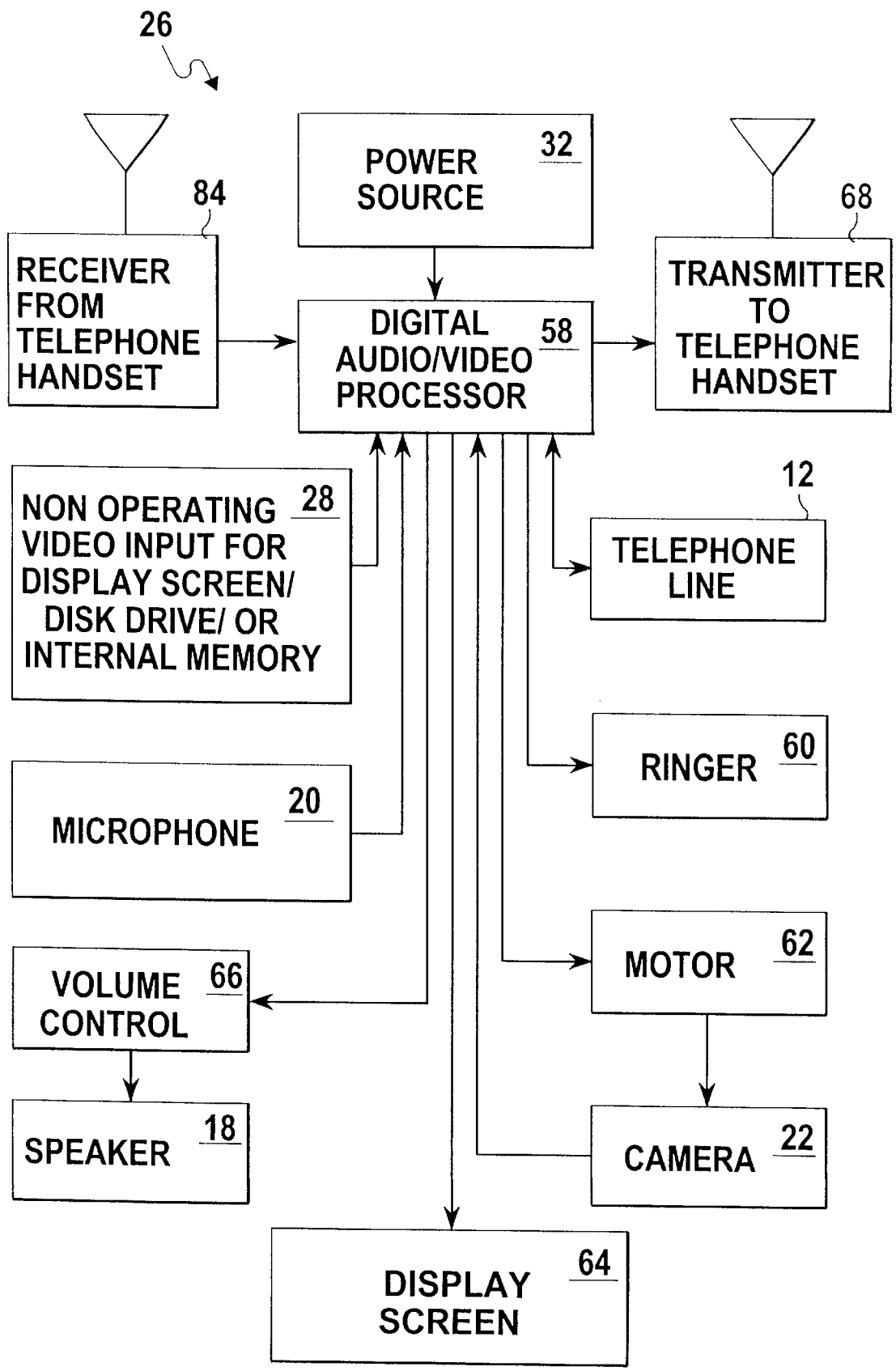
FIG. 5 is a block diagram illustrating the internal components of the video telephone of the present invention.

FIG. 5 illustrates the internal components of the video display unit 26 of the present invention. The video display unit 26 includes a digital audio/video processor 58 which is connected to the display screen 64 for delivering an image for display thereon. The digital audio/video processor is connected to receive audio and digital data signals via the connection to the telephone line 12 and audio and data signals via a receiver 84 from the telephone handset 40. The audio and digital data signals received through the connection from the telephone line 12 are representative of the audio signals and image captured by the digital camera at the other end of the communication channel respectively and transmitted across the telephone line 12. The digital audio/video processor 58 is also connected to the disk drive/video input device 28 for receiving data therefrom for displaying a desired image on the video display screen 64 when the video display unit 26 is in a not-in-use mode. The image delivered to the display screen 64 is produced from data received from one of a diskette inserted in the video input device 28 or stored within an internal memory within the video input device 28. The digital audio/video processor 58 receives audio data from the microphone 20 and digital data representative of the image captured by the digital camera 22 for transmission over the telephone line 12 to a party at the other end of a communication and also processes the digital data for display on the display screen 64. When an incoming call is received by the digital audio/video processor 58 via the connection 12 to the telephone line, a signal is delivered to the ringer 60 to inform the party at the receiving end of the communication that a telephone call is incoming. Power is received by the video display unit 26 and the digital audio/video processor 58 via a connection 32 to an external power source. An internal power source may also be connected within the display unit 26 to also provide power as needed.

A transmitter 68 within the display unit 26 and connected to the digital audio/video processor 58 transmits audio signals and ringer signals received from the telephone line 12 to the remote/cordless handset 40 so a user may communicate directly through the remote/cordless handset 40. A receiver 84 receives control signals from the remote/cordless handset 40 which control a motor 62 which acts to move the camera 22 in any direction to capture a different image. The video display unit 26 acts a base unit in a conventional cordless telephone receiving dialing and speaker phone signals from the handset 40 for establishing a connection with the telephone line 12 and initiating activation of the speaker 18 for audibilizing an audio signal representative of the audio signal transmitted by the party at the other end of the communication. The volume at which the speaker 18 is set is variable and may be controlled by a signal received from the remote/cordless handset 40.

Figure 6:
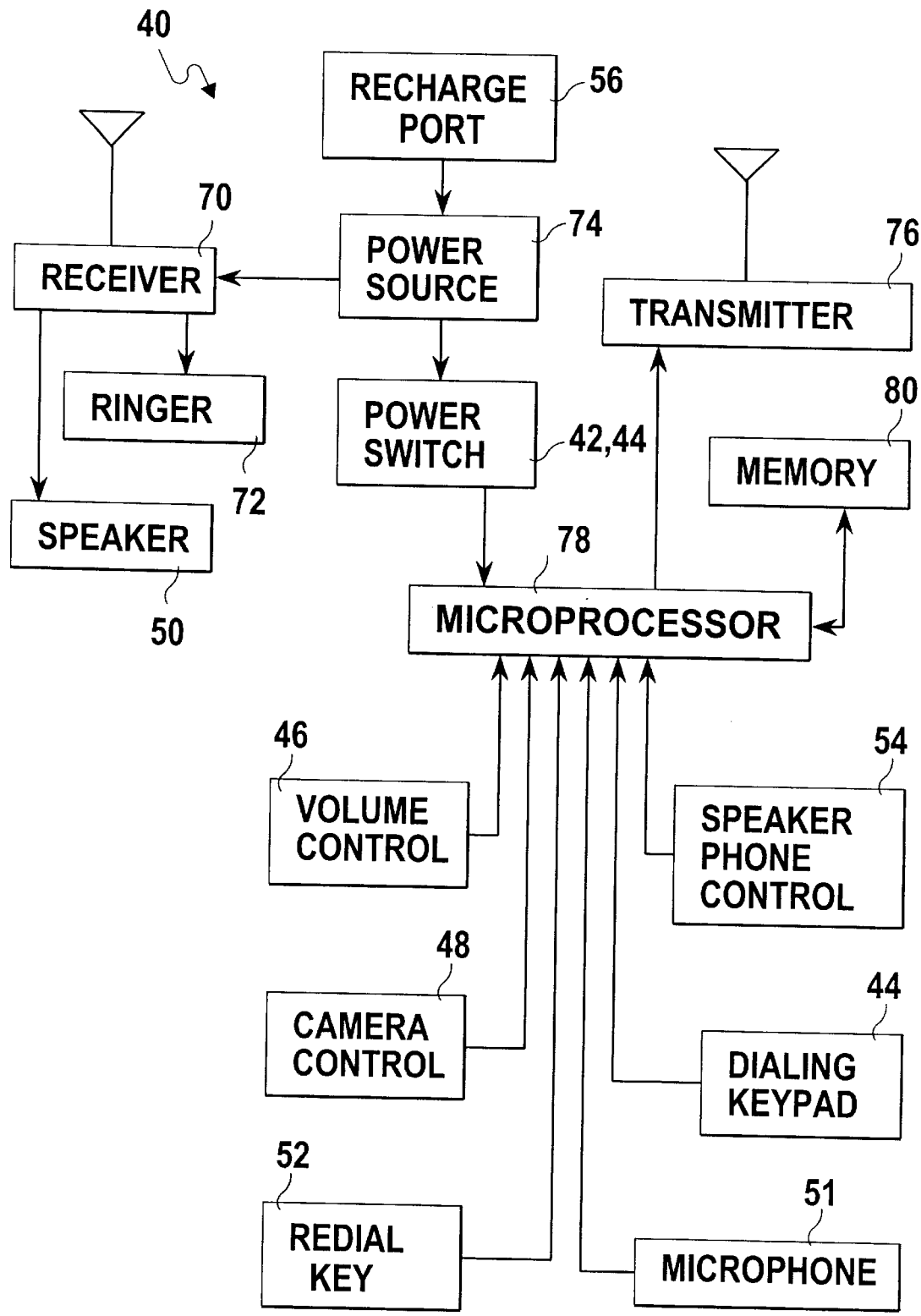
FIG. 6 is a block diagram illustrating the internal components of the mobile/cordless handset used with the video telephone of the present invention.

The internal components of the remote/cordless handset 40 are illustrated in FIG. 6. The remote/cordless handset 40 includes a microprocessor 78. The microprocessor 78 is connected to an internal power source 74 via the off and talk switches 42, 44. The microprocessor 78 is also connected to receive control signals from the dialing keypad 44, the volume control keys 46, the camera control keys 48, the microphone 51, the redial button 52 and the speaker phone control 54 for transmission of the received control signals to the video display unit 26 when the talk key 42 is activated. The speaker phone control key 54 will transmit a signal to the microprocessor 78 indicative of a desire to activate or deactivate the speaker 18 on the display unit 26 and the volume control key 46 will transmit a signal indicating a desire to increase or decrease the volume of the speaker 18 when the speaker 18 is activated by the speaker phone control key 54. The dialing keypad 44 will transmit a signal indicative of a desired telephone number to call to the transmitter 78 for relay to the video display unit 26 and ultimate transmission through the telephone line 12. The telephone numbers input through the dialing keypad 44 are stored in a memory unit 80 by the microprocessor 78 for use when activating the redial key 52, thus the last dialed telephone number need not be fully re-input using the dialing keypad 44 but automatically redialed by pressing the redial key 52. Audio signals are also input to the microprocessor 78 via the microphone 51 for transmission to the video display unit 26 and over the telephone line 12 to the party with which the telephone communication is being held.

The handset 40 also includes a receiver 70 connected to a speaker 50 and ringer 72 for receipt of audio signals and telephone ringing signals from the video display unit 26 as in a conventional cordless telephone. The receiver 70 is connected to receive power from the internal power source 74 at all times and thereby can receive a call ring signal from the video display unit 26 at any time a call is received by the video display unit 26. The power source 74 is preferably rechargeable and can be recharged by an external power source via the recharge port 56.

It is to be understood that this video telephone will operate either solely, i.e. only one of the parties to the communication has video telephone capabilities, or if both or all of the parties to the communication is using a telephone with video capabilities. If all of the parties do not have video telephone capabilities, the video telephone will operate as a conventional audio telephone. As in all conventional audio telephones, this device is able to accommodate all service provided by the telephone company including caller ID, call waiting, conference calling, voice mail, etc.

The operation of the device and system will now be described. It is to be understood that the operation of the present invention is similar to that of a conventional cordless phone but includes video capabilities and is able to display an image on the display screen when a communication channel is not open.

In operation, the video display unit is securely positioned on a wall and is connected to an electrical outlet or other power source and also to the conventional telephone line. An internal power source is placed within the remote/cordless handset to place it in an operational mode and the video telephone is prepared for use. When no communication channel is in use, a diskette is placed within the disk drive and data representative of a video image and stored thereon is read by the digital microprocessor for display on the display screen. If such data is stored on an internal memory, the data stored therein may be read for display on the display screen.

When the user wishes to place an outgoing call, the talk key on the remote/cordless handset is pressed to activate the video telephone and receive a dial tone. At this time the digital camera is also activated to begin capturing an image in its view. The user then dials a telephone number on the numerical keypad which is transmitted to the video display unit and a telephone call is initiated. When the called party answers the telephone at the other end of the communication a connection is established. At this time both audio signals and digital data signals representative of the image captured by the digital camera are processed in the microprocessor and transmitted over the telephone line between the communicating parties. The digital signal from the camera at each end of the communication displays the image on the display screen along with the image represented by the digital data signal transmitted by the telephone at the other end of the communication.

The user may move the camera to change its line of sight by pressing the control keys on the remote/cordless handset When these keys are pressed, a control signal is transmitted to the display unit and based on the control signals the microprocessor controls a motor to move the camera as desired. The volume of the speaker on the display unit may be controlled by pressing the volume keys on the remote/cordless handset. In this instance, a volume control signal is transmitted to the display unit and based upon these signals the volume of the speaker is controlled in a conventional manner. When it is desired to end the communication, the off key on the remote/cordless handset is pressed and the communication is terminated. The camera is turned off and the microprocessor once again reads the data stored in either the internal memory or on a diskette inserted in the disk drive to display an image on the display unit.

When a telephone call is placed to the video telephone, a signal is received through the telephone line connection and the microprocessor causes the ringer in the display unit to ring and transmits a signal to the remote/cordless handset causing the ringer therein to produce a sound indicative of an incoming call. When the talk key on the remote/cordless handset is pressed a call is initiated and the camera is turned on and the call proceeds as described above.

From the above description it can be seen that the video telephone of the present invention is able to overcome the shortcomings of prior art devices by providing a video telephone which is able to be controlled via remote control and may be hung on a wall. The video telephone of the present invention also includes a camera which can be manipulated via remote control to pan up and down, provides a picturesque image on its screen when not in use and is able to provide an image of both the calling and receiving party on the screen concurrently. The video telephone also includes a speaker and microphone for use without the need for a handset. Furthermore, the remote control portable signal device and system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A video telephone comprising:
   a) a flat screen surrounded by a frame containing a telephone base unit directly connected to a conventional telephone line having means for receiving and sending telephone calls containing video and audio information, said flat screen displaying video images both being received and being sent, said frame containing means for storing, receiving and sending signals from and to a remote wireless handset, a microphone in said frame for capturing audio signals for transmittal through said telephone line, a video camera adjustably mounted in said frame for being moved within said frame for capturing video images for display on said screen and transmittal through said telephone line, and a speaker in said frame for broadcasting audio signals;
   b) said wireless handset controlling said telephone base unit and having means for generating a control signal for switching said telephone base unit between a first not-in-use mode and a second in-use mode, speaker means for listening to audio telephone signals received from said base unit when in said second mode, and microphone means for sending voice signals to said base unit for transfer to said telephone line in said second mode;
   c) disk drive means in said frame for generating a selected video image for said screen to be displayed when said base unit is in its first mode; and
   d) said handset further including keypad means for generating and sending dialing instructions to said base unit, means for generating and sending a control signal to said base unit for activating said speaker and microphone on said display unit, and means comprising four control keys for generating and sending a camera control signal for moving said camera horizontally and vertically in said display unit to change its line of sight.

* * * * *